United States Patent
Turlotte et al.

(10) Patent No.: US 9,045,284 B2
(45) Date of Patent: Jun. 2, 2015

(54) DEVICE FOR TRANSPORTING HOLLOW BODIES

(75) Inventors: Denis Turlotte, Octeville sur Mer (FR); Yvan Maurovic, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 0 days.

(21) Appl. No.: 13/700,868

(22) PCT Filed: Jun. 1, 2011

(86) PCT No.: PCT/EP2011/059031
§ 371 (c)(1),
(2), (4) Date: Nov. 29, 2012

(87) PCT Pub. No.: WO2011/157557
PCT Pub. Date: Dec. 22, 2011

(65) Prior Publication Data
US 2013/0062163 A1    Mar. 14, 2013

(30) Foreign Application Priority Data
Jun. 17, 2010 (FR) .................................... 10 54820

(51) Int. Cl.
*B65G 19/02* (2006.01)
*B65G 43/02* (2006.01)
*B65G 47/86* (2006.01)
*B29C 49/42* (2006.01)

(52) U.S. Cl.
CPC ............. *B65G 19/02* (2013.01); *B29C 49/4205* (2013.01); *B65G 43/02* (2013.01); *B65G 47/847* (2013.01); *B65G 2201/0244* (2013.01); *B65G 2207/48* (2013.01)

(58) Field of Classification Search
CPC ....... B65G 47/847; B65G 43/02; B65G 19/02; B65G 2207/48
USPC ........................................... 198/470.1, 803.9
See application file for complete search history.

(56) References Cited

U.S. PATENT DOCUMENTS

| 3,479,640 A | 11/1969 | Puma |
| 3,902,158 A * | 8/1975 | Dahlkvist ..................... 340/454 |
| 4,061,952 A * | 12/1977 | Dinsdale et al. .............. 318/572 |

(Continued)

FOREIGN PATENT DOCUMENTS

| FR | 2 895 384 A1 | 6/2007 |
| WO | 00/61472 A1 | 10/2000 |

OTHER PUBLICATIONS

International Search Report, dated Jun. 27, 2011, from corresponding PCT application.

*Primary Examiner* — Gene Crawford
*Assistant Examiner* — Thomas Randazzo
(74) *Attorney, Agent, or Firm* — Young & Thompson

(57) ABSTRACT

A device for transporting hollow bodies, includes: —at least one element for grasping a hollow body, the element including at least one cam follower (30A) made of an electrically conductive material; —at least one fixed cam (32) which is intended to engage with the cam follower (30A), the cam (32) being made of an electrically conductive material; —a contact layer (34) which is made of an electrically insulating material and is interposed between the cam (32) and the cam follower (30A); characterized in that the cam follower (30A) is connected to a first electrical signal (P1) whereas the cam (32) is connected to a second electrical signal (P2), a member (36) being positioned so as to detect electrical contact between the cam follower (30A) and the cam (32).

8 Claims, 2 Drawing Sheets

(56) References Cited

U.S. PATENT DOCUMENTS

| | | | |
|---|---|---|---|
| 4,737,775 A * | 4/1988 | Tokuda et al. | 340/647 |
| 4,744,241 A * | 5/1988 | Mayer | 73/104 |
| 5,228,478 A * | 7/1993 | Kleisle | 138/104 |
| 6,066,085 A * | 5/2000 | Heilman et al. | 600/16 |
| 7,849,998 B2 * | 12/2010 | Langlois et al. | 198/803.9 |
| 8,132,467 B2 * | 3/2012 | Shinde et al. | 73/774 |
| 2003/0066623 A1 * | 4/2003 | McLean et al. | 165/11.1 |
| 2009/0208159 A1 * | 8/2009 | Heim et al. | 384/448 |

* cited by examiner

DEVICE FOR TRANSPORTING HOLLOW BODIES

The invention relates to a device for transporting hollow bodies formed of a thermoplastic material.

More specifically, the invention relates to a device for transporting hollow bodies formed of a thermoplastic material, which comprises:
- at least one means for grasping a hollow body which is to be displaced along a given trajectory, comprising at least one cam follower constructed of an electrically conductive material;
- at least one fixed cam for the control of the means for grasping, arranged longitudinally to at least one section of the trajectory of the means for grasping and designed to cooperate with the cam follower, the cam being constructed of an electrically conductive material;
- a contact layer, which is formed of an electrically insulating material and is interposed between the cam and the cam follower.

Thermoplastic receptacles, such as bottles, are manufactured from plastic blanks which are heat-treated, then formed by blow molding or stretch blow molding.

In the remainder of the description, the term "hollow body" may be applied to both blanks and finished receptacles.

Accordingly, installations for the mass production of thermoplastic receptacles comprise at least one heat-treatment station, consisting of a heat tunnel through which the blanks are passed in sequence, and at least one blow molding or stretch blow molding station, which is equipped with appropriate molds for the accommodation of the incoming sequence of heat-treated blanks.

The blanks are furthermore conveyed from one station to the next by transport means. For example, an arrangement is known whereby the stations are positioned in proximity to each other, and the blanks are conveyed from one station to the next by means of conveyor wheels which are provided with means for grasping.

In general, the means for grasping are controlled by means of cam followers which cooperate with cams. The cams constitute fixed elements, which are generally expensive to produce. In order to prevent wear to cams, cam followers are fitted with metal rollers which are provided with a rubber coating for the protection of cams.

However, the protective coating of the cam follower rollers may be susceptible to deterioration, if not accidental failure. In this case, the metal roller will lie in direct contact with the cam. This is liable to result in wear to the cam.

Moreover, the installation is likely to remain in service for a considerable length of time before the deterioration or failure of the coating is observed, e.g. by visual inspection.

Document FR-A1-2.895.384 discloses means for grasping of this type. However, this document does not propose any solution for the detection of the failure of the protective coating on cam follower rollers.

In order to prevent wear to the cam, the invention therefore proposes a device of the type described above, characterized in that the cam follower is connected to a source of a first electrical signal, whereas the cam is connected to a source of a second electrical signal, and in that the device is provided with an element for the detection of electrical contact between the cam follower and the cam, thereby signaling the deterioration of the layer.

According to further characteristics of the invention:
- the source of the first signal is provided by the ground potential;
- the second electrical signal for the cam is a potential which exceeds the potential of the first electrical signal for the cam follower;
- the detection element is formed by an instrument for the measurement of potential difference, one terminal of which is electrically connected to the cam and another terminal of which is electrically connected to the cam follower, whereby a drop in voltage indicates electrical contact between the cam follower and the cam;
- the detection element is formed by an electric dipole which is capable of detecting the flow of an electric current and is interposed in the electric circuit between the source of the second electrical signal and the cam, whereby electrical contact between the cam and the cam follower results in the flow of an electric current on the interior of the dipole;
- the cam follower is formed by a roller covered with a rolling tread which forms the insulating material layer;
- the cam follower and the cam are capable of controlling the opening and closure of the means for grasping;
- the means for grasping comprise a clamp which is mounted on the end of an articulated arm, and in that the cam follower and the cam are capable of controlling the orientation of the arm.

Further characteristics and advantages of the invention will become apparent from the detailed description which follows, for the clarification of which reference is made to the attached drawings, in which.

In the remainder of the description, components with an identical, comparable or similar function will be designated by identical reference numbers.

In the remainder of the description, but not by way of limitation, the vertical and radial orientations considered are those indicated by the arrows "V, R" in the figures.

Figure 1:
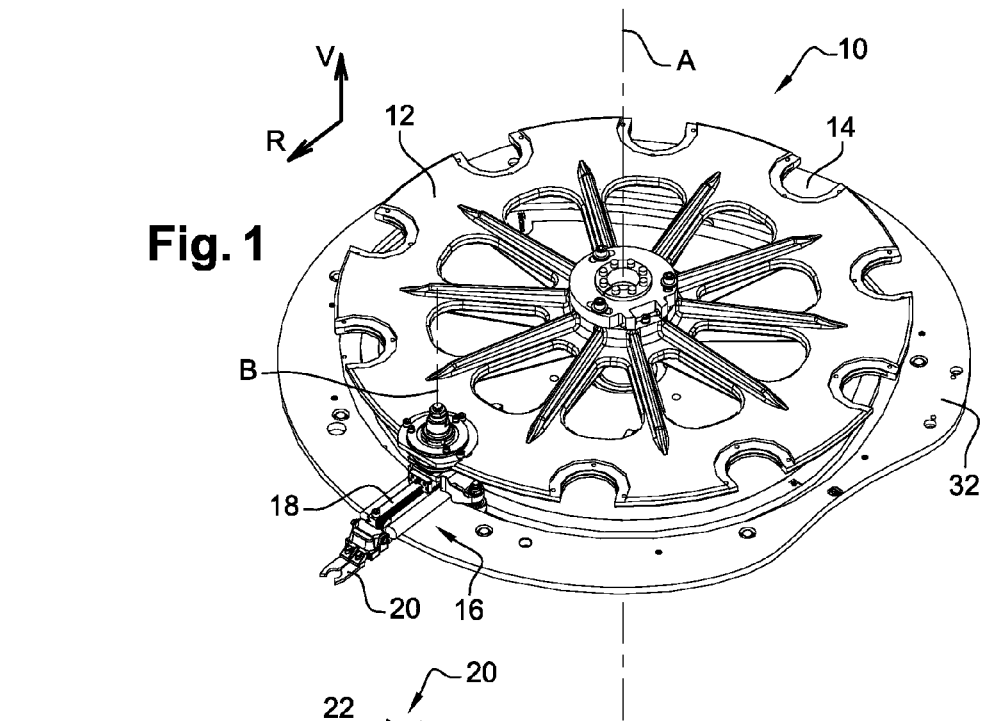
FIG. 1 shows a perspective view of a conveyor device for blanks which is constructed in accordance with the teaching of the invention.

FIG. 1 shows a device 10 for transporting hollow bodies (not represented) formed of a thermoplastic material. This conveyor device 10 is fitted to an installation for the mass production of thermoplastic receptacles. In an installation of this type, the final receptacles are formed by the blow molding of a thermoplastic blank.

An installation of this type is conventionally provided with a heat-treatment kiln (not represented) through which the blanks pass in sequence, means (not represented) for the infeed of blanks into the kiln, a station (not represented) for the blow molding or stretch blow molding of blanks following the heat-treatment thereof, and the device 10 for the conveyance of the heat-treated blanks to the blow molding station.

In this case, the conveyor device 10 represented in FIG. 1 is arranged for the conveyance of blanks from the heat-treatment kiln to the blow molding station.

In an unrepresented variant, the invention is naturally applicable to the means for the infeed of blanks to the kiln, specifically where these means are comprised of a conveyor wheel, or of any other means of transporting blanks which might be fitted to the installation for the manufacture of receptacles.

In this case, the conveyor device 10 is provided with a horizontal wheel 12 which is mounted to rotate on a vertical axis of rotation "A". Indentations 14 are formed in the outer edge of the wheel 12.

Each indentation 14 forms a seating location, to which a means 16 for the grasping of a blank is attached. In the example shown in FIG. 1, a single means for grasping 16 is represented, in the interests of clarity.

More specifically, the means for grasping 16 comprises an articulated radial arm 18. A first inner end of the arm 18 is fitted to the edge of the wheel 12, and is arranged to pivot about a vertical axis "B". A second outer free end of the arm 18 is provided with a clamp 20 for the gripping of a blank.

Figure 2:
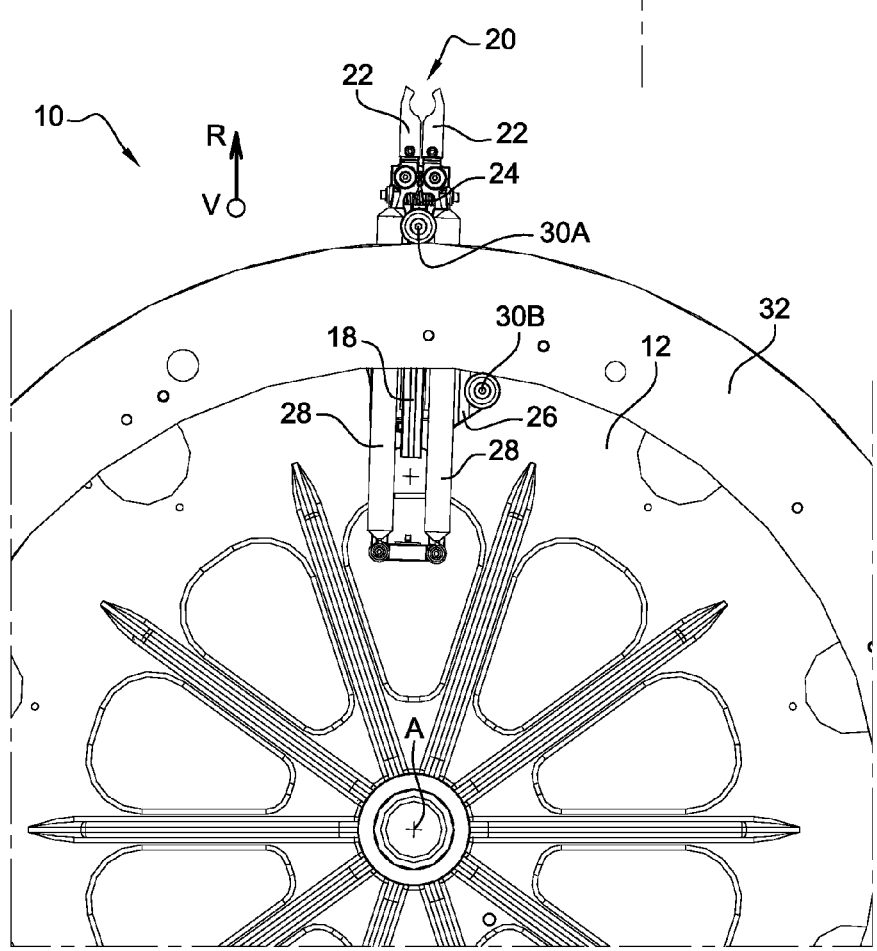
FIG. 2 shows an enlarged view of the underside of a means for grasping in the conveyor device represented in FIG. 1.

As shown in greater detail in FIG. 2, the clamp 20 is comprised of two jaws 22, which are arranged to pivot about two vertical axes between an open position, which will allow the insertion of the neck of a blank, and a closed position, wherein the neck of the blank is clamped in place. The clamp 20 is provided with a spring-back function to its closed position by means of a first spring 24.

Figure 3:
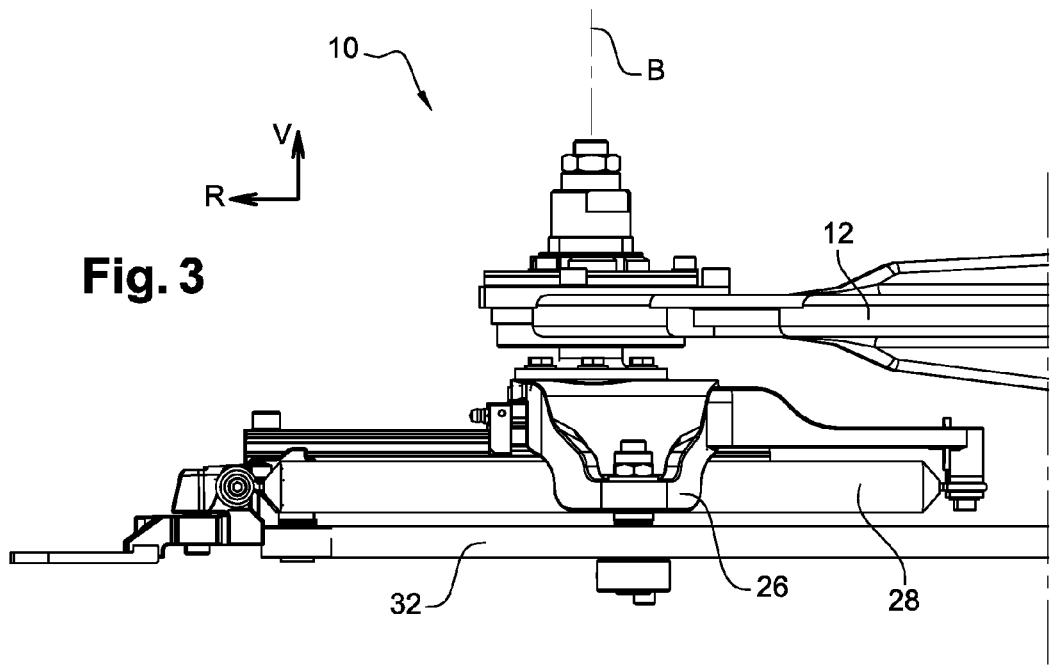
FIG. 3 shows a side view of the means for grasping represented in FIG. 2.

The arm 18 is in this case designed to slide in its longitudinal axis, in relation to its pivot axis "B", between a position of radial retraction to the interior and a position of radial extension to the exterior. To this end, the arm 18 is accommodated in a slider 26, which is itself arranged to pivot about the axis "B" on the wheel 12, as illustrated in FIG. 3.

The arm 18 is returned to its retracted position by two return springs 28, which are arranged in parallel. A first outer end of each spring 28 is attached to the clamp 20, whereas a second inner end of each spring 28 is attached to the slider 26.

The means for grasping 16 is therefore susceptible to displacement by the rotation of the wheel 12 along a circular trajectory around the axis "A".

In order to ensure the optimum capture or release of a blank by the clamp 20 on each means for grasping 16, i.e. without damaging or dropping the blank, means are provided for the control of the longitudinal position of the arm 18 and for the control of the pivoting of the arm 18 about its axis "B".

To this end, the means for grasping 16 comprises at least one cam follower 30 formed of an electrically conductive material, e.g. a metallic material such as steel. As represented in FIG. 2, the means for grasping 16 is equipped in this case with two cam followers, indicated hereinafter by the reference numbers 30A and 30B.

In this case, the first cam follower 30A is mounted on an outer end section of the arm 18. More specifically, the first cam follower 30A is arranged in proximity to the clamp 20.

In this case, the second cam follower 30B is mounted on the slider 26, in proximity to the inner end of the arm 18.

Each of the cam followers 30A, 30B is covered with a contact layer 34 formed of an electrically insulating material. In the example represented in the figures, each roller that forms a cam follower 30A, 30B is of metal construction, and the rim of said metal roller is covered with a rolling tread of rubber or plastic. The rolling tread thus forms said layer 34 of electrically insulating material.

The two cam followers 30A, 30B are arranged at the same vertical height.

Each of the cam followers 30A, 30B is designed to cooperate with at least one fixed cam 32 for the control of the means for grasping 16. The cam 32 is arranged longitudinally to at least one section of the trajectory of the means for grasping 16.

As represented in FIG. 1, the cam 32, in this case, is formed by a ring which completely surrounds the wheel 12. The cam 32 is secured to a frame 31 (represented in FIGS. 4 and 5), which itself is secured to the ground.

The cam 32 is constructed of a robust material which, for the purposes of the invention, also has the property of electrical conductivity. The cam 32 may be formed for example of a metal, such as steel.

In this case, the cam 32 comprises a first cam race 32A and a second cam race 32B, which are designed to cooperate with the first cam follower 30A and the second cam follower 30B respectively. The first cam race 32A is formed by the vertical outer edge of the cam 32, while the second cam race 32B is formed by the vertical inner edge of the cam 32.

Accordingly, the configuration of the cam races 32A, 32B permits the simultaneous control of both the longitudinal position of the arm 18 and of the angular position of the arm 18 about its pivot axis "B".

The specific function of the contact layer 34 carried by the cam follower rollers 30A, 30B is to prevent wear to the cam 32 and, by association, to the cam follower rollers 30A, 30B, by preventing metal-on-metal friction between each cam follower roller 30A, 30B and the associated cam race 32A, 32B. Specifically, the contact layer 34 is interposed between the cam 32 and each associated cam follower roller 30A, 30B.

In some cases, deterioration of the contact layer 34 has been observed. By deterioration, it is understood that the contact layer 34 may be damaged, perforated or even severed. In case of failure, the contact layer 34 may fall completely from the cam follower roller 30A, 30B.

This deterioration may be the consequence of normal wear or exceptional conditions of service. In case of the deterioration of the contact layer 34, there will be direct contact between the metallic element of the cam follower roller 30A, 30B and the associated cam race 32A, 32B, thereby resulting in wear to the cam 32.

As the cam 32 is an expensive component, which is difficult to replace, the invention proposes that the conveyor device 10 be equipped with means for the detection of the failure of a contact layer 34.

Figure 4:
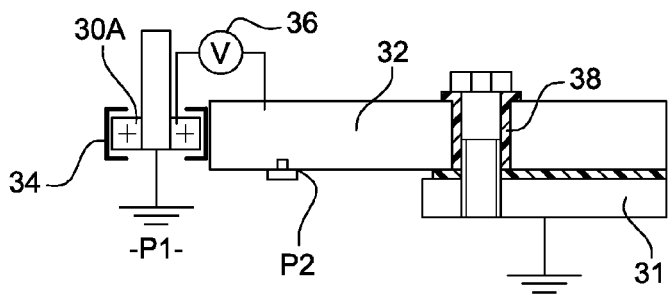
FIG. 4 shows a schematic representation of a means for grasping and a fixed cam in the device represented in FIG. 1, together with an electric circuit which is provided with a short-circuit detection element, according to a first mode of embodiment of the invention.

As represented in FIG. 4, each metal roller that forms a cam follower 30A, 30B receives a first electrical signal "P1", in this case at a constant potential, whereas the cam 32 receives a second electrical signal "P2", in this case at a constant potential. As each cam follower roller 30A, 30B is electrically isolated from the cam 32 by the insulating contact layer 34, the potential difference "P2-P1" between these two elements is normally constant.

The two cam followers 30A, 30B are electrically interconnected, e.g. by means of the metallic structure of the arm 18. Accordingly, the two cam followers 30A, 30B may simultaneously receive the same first signal "P1" via a single electrical connection between the arm 18 and the source of the first signal "P1".

In this case, each of the signals "P1" and "P2" has a constant value.

In the example represented in FIG. 4, the source of the first signal "P1" is provided by the ground potential, whereas the source of the second signal "P2" is provided by the positive terminal of an electrical accumulator or d.c. generator. Accordingly, the second electrical signal "P2" on the cam 32 is higher than the first electrical signal "P1" on each of the cam followers 30A, 30B.

The frame 31 which carries the cam 32 is generally connected to ground. In consequence, the cam 32 is electrically isolated from the frame 31 by means of insulation 38, in order to prevent any electrical leakage.

The device 10 is provided with an element 36 for the detection of electrical contact between each cam follower 30A, 30B and the cam 32, as a means of signaling a failure of the contact layer 34.

In a first form of embodiment of the invention, the detection element 36 is formed by an instrument for the measurement of potential difference, such as a voltmeter, one terminal of which is electrically connected to the cam 32, and another terminal of which is electrically connected to the cam follower 30A, 30B. The second terminal of the detection element 36 may for example be electrically connected to the arm 18.

Accordingly, the detection element 36 formed by the voltmeter measures a potential difference equal to P2-P1 when the cam 32 is correctly isolated from each cam follower 30A, 30B by means of the insulating layer 34.

Where a drop in voltage is detected, this indicates electrical contact between at least one of the cam followers 30A, 30B and the cam 32. A failure of one of the contact layers 34 is deduced therefrom. Appropriate action is then initiated.

The detection element 36 is for example connected to an audible or visual warning device, which alerts an operator to the presence of a damaged contact layer 34.

The detection element 36 may also be connected to a programmable logic controller, which actuates the immediate shutdown, or slightly postponed shutdown, of the production line in order to prevent wear to the cam 32.

Figure 5:
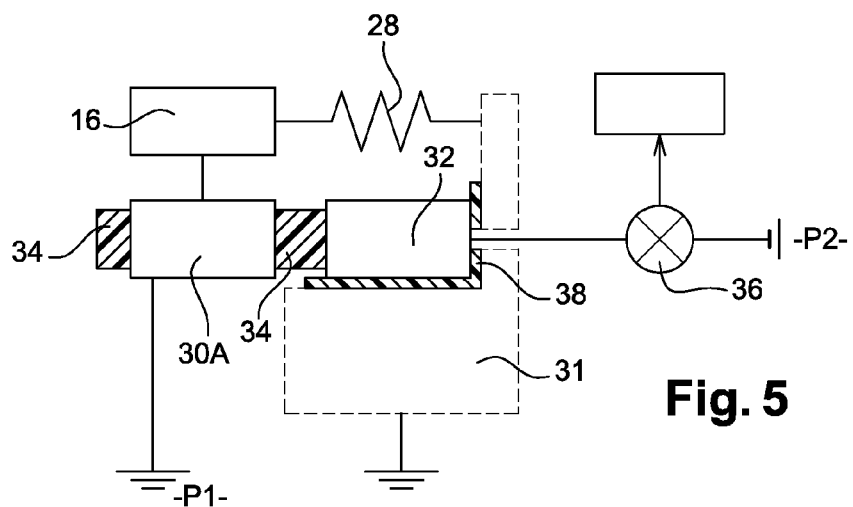
FIG. 5 shows a similar view to FIG. 4, representing a second mode of embodiment of the invention.

In a second form of embodiment of the invention, represented in FIG. 5, the detection element 36 is formed by an electric dipole, such as a lamp or an LED, which is capable of detecting the flow of an electric current and is interposed in the electric circuit between the source of the second electrical signal "P2" and the cam 32. Accordingly, where the contact layer 34 is damaged or severed, electrical contact between the cam 32 and at least one of the cam followers 30A, 30B results in the flow of an electric current on the interior of the dipole.

In an unrepresented variant of the invention, the opening and closure of the clamp on the means for grasping may be controlled by a cam follower, which is mounted on the means for grasping and which cooperates with a fixed cam. In this case, the invention described above may be applied to such means for control.

A device 10 of this type therefore permits the rapid detection of a failure of the contact layer 34.

In addition, the return springs 28 are also formed of an electrically conductive material, and are also electrically connected to the source of the first signal P1 by means of the arm 18. Accordingly, it is possible to detect a malfunction associated with a failure of one of these springs 28 when said severed spring 28 is in friction contact with the cam 32.

The present invention is applied to a conveyor wheel for hollow bodies formed of thermoplastic materials. However, it will be understood that the term "conveyor device" used in the claims may also refer to any other device which is designed for the movement of hollow bodies, such as blow molds for hollow bodies mounted on a carousel, wherein the rotation of the carousel results in the movement of said hollow bodies.

The invention claimed is:

1. A conveyor device (10) for transporting hollow bodies formed of a thermoplastic material, which comprises:
    at least one means (16) for grasping a hollow body which is to be displaced along a given trajectory, comprising at least one cam follower (30A, 30B) constructed of an electrically conductive material;
    at least one fixed cam (32) for the control of the means for grasping (16), arranged longitudinally to at least one section of the trajectory of the means for grasping (16) and designed to cooperate with the cam follower (30A, 30B), the cam (32) being constructed of an electrically conductive material;
    a contact layer (34), which is formed of an electrically insulating material and is interposed between the cam (32) and the cam follower (30A, 30B);
    wherein the cam follower (30A, 30B) is connected to a source of a first electrical signal (P1), wherein the cam (32) is connected to a source of a second electrical signal (P2), and wherein the device (10) is provided with an element (36) for the detection of electrical contact between the cam follower (30A, 30B) and the cam (32), thereby signaling the deterioration of the layer (34).

2. The device (10) as claimed in claim 1, wherein the source of the first signal (P1) is provided by the ground potential.

3. The device (10) as claimed in claim 1, wherein the second electrical signal (P2) for the cam (32) is a potential which exceeds the potential of the first electrical signal (P1) for the cam follower (30A, 30B).

4. The conveyor device according to claim 1,
    wherein the detection element (36) is formed by an electric dipole which is capable of detecting the flow of an electric current and is interposed in the electric circuit between the source of the second electrical signal (P2) and the fixed cam (32), whereby electrical contact between the fixed cam (32) and the cam follower (30A, 30B) results in the flow of an electric current on the interior of the electric dipole.

5. The device (10) as claimed in claim 1, wherein the cam follower (30A, 30B) and the cam (32) control opening and closure of the means for grasping.

6. The device (10) as claimed in claim 1, wherein the means for grasping (16) comprise a clamp (20) which is mounted on the end of an articulated arm (18), and wherein the cam follower (30A, 30B) and the cam (32) control orientation of the arm.

7. A conveyor device (10) for transporting hollow bodies formed of a thermoplastic material, which comprises:
    at least one means (16) for grasping a hollow body which is to be displaced along a given trajectory, comprising at least one cam follower (30A, 30B) constructed of an electrically conductive material;
    at least one fixed cam (32) for the control of the means for grasping (16), arranged longitudinally to at least one section of the trajectory of the means for grasping (16) and designed to cooperate with the cam follower (30A, 30B), the cam (32) being constructed of an electrically conductive material;
    a contact layer (34), which is formed of an electrically insulating material and is interposed between the cam (32) and the cam follower (30A, 30B);
    wherein the cam follower (30A, 30B) is connected to a source of a first electrical signal (P1), wherein the cam (32) is connected to a source of a second electrical signal (P2), and wherein the device (10) is provided with an element (36) for the detection of electrical contact between the cam follower (30A, 30B) and the cam (32), thereby signaling the deterioration of the layer (34), and wherein the cam follower (30A, 30B) is formed by a roller covered with a rolling tread which forms the insulating material layer (34).

8. A conveyor device (10) for transporting hollow bodies formed of a thermoplastic material, the conveyor device comprising:

means (16) for grasping a hollow body which is to be displaced along a given trajectory, comprising a cam follower (30A, 30B) constructed of an electrically conductive material;

a fixed cam (32) for control of the means for grasping (16), arranged longitudinally to at least one section of the trajectory of the means for grasping (16) and designed to cooperate with the cam follower (30A, 30B), the fixed cam (32) being constructed of an electrically conductive material;

a contact layer (34) formed of an electrically insulating material and interposed between the fixed cam (32) and the cam follower (30A, 30B);

a source of a first electrical signal (P1) connected to the cam follower (30A, 30B);

a source of a second electrical signal (P2) connected to the fixed cam (32); and a detection element (36) for detecting of electrical contact between the cam follower (30A, 30B) and the fixed cam (32), thereby signaling deterioration of the contact layer (34), wherein the detection element (36) is formed by an instrument for measurement of potential difference, one terminal of which is electrically connected to the fixed cam (32) and another terminal of which is electrically connected to the cam follower (30A, 30B), whereby a drop in voltage indicates electrical contact between the cam follower (30A, 30B) and the fixed cam (32).

\* \* \* \* \*